United States Patent
Sanguineti et al.

(10) Patent No.: US 11,180,655 B2
(45) Date of Patent: Nov. 23, 2021

(54) POLYMER ALLOY COMPRISING A SULPHUR-CONTAINING AROMATIC POLYMER AND A THERMOPLASTIC VULCANIZATE

(71) Applicant: SOLVAY SPECIALTY POLYMERS ITALY S.P.A., Bollate (IT)

(72) Inventors: Aldo Sanguineti, Milan (IT); Marco Mirenda, Rho (IT)

(73) Assignee: SOLVAY SPECIALTY POLYMERS ITALY S.P.A., Bollate (milano) (IT)

( * ) Notice: Subject to any disclaimer, the term of this patent is extended or adjusted under 35 U.S.C. 154(b) by 226 days.

(21) Appl. No.: 16/607,097

(22) PCT Filed: Apr. 19, 2018

(86) PCT No.: PCT/EP2018/059995
§ 371 (c)(1),
(2) Date: Oct. 21, 2019

(87) PCT Pub. No.: WO2018/193019
PCT Pub. Date: Oct. 25, 2018

(65) Prior Publication Data
US 2020/0062959 A1 Feb. 27, 2020

(30) Foreign Application Priority Data
Apr. 21, 2017 (EP) ..................................... 17167521

(51) Int. Cl.
*C08L 81/02* (2006.01)
*C08L 27/16* (2006.01)

(52) U.S. Cl.
CPC ............... *C08L 81/02* (2013.01); *C08L 27/16* (2013.01); *C08L 2205/025* (2013.01); *C08L 2205/03* (2013.01); *C08L 2205/035* (2013.01); *C08L 2205/22* (2013.01); *C08L 2310/00* (2013.01)

(58) Field of Classification Search
CPC ..................... C08L 81/00–10; C08L 2205/035
See application file for complete search history.

(56) References Cited

U.S. PATENT DOCUMENTS

| | | | |
|---|---|---|---|
| 3,634,355 A | 1/1972 | Barr et al. | |
| 4,008,203 A | 2/1977 | Jones | |
| 4,108,837 A | 8/1978 | Johnson et al. | |
| 4,175,175 A | 11/1979 | Johnson et al. | |
| 4,281,092 A | 7/1981 | Breazeale | |
| 4,395,512 A | 7/1983 | Kubota et al. | |

(Continued)

FOREIGN PATENT DOCUMENTS

| | | |
|---|---|---|
| EP | 0431470 A2 | 6/1991 |
| EP | 661304 A1 | 7/1995 |

(Continued)

OTHER PUBLICATIONS

Espacenet translation of JP H03263464 (Year: 2021).*

*Primary Examiner* — Michael M Dollinger
(74) *Attorney, Agent, or Firm* — Osha Bergman Watannabe & Burton LLP (57) ABSTRACT

The present invention relates to a polymer alloy comprising a sulphur-containing aromatic polymer and at least one thermoplastic vulcanizate which has an improved dispersibility, to a process for the preparation thereof and to articles comprising the same.

19 Claims, 4 Drawing Sheets

(56) References Cited

U.S. PATENT DOCUMENTS

| | | | |
|---|---|---|---|
| 5,006,594 A * | 4/1991 | Rees | C08L 27/12 |
| | | | 524/520 |
| 5,447,993 A | 9/1995 | Logothetis | |
| 5,470,901 A | 11/1995 | Ishiwari et al. | |
| 5,789,489 A | 8/1998 | Coughlin et al. | |
| 7,910,655 B2 * | 3/2011 | Baek | C08L 81/02 |
| | | | 525/65 |
| 2009/0011163 A1 * | 1/2009 | Ajbani | C08L 81/02 |
| | | | 428/36.9 |
| 2012/0232210 A1 * | 9/2012 | Cheng | B29C 48/295 |
| | | | 524/514 |
| 2015/0065625 A1 * | 3/2015 | Nadella | B29C 48/37 |
| | | | 524/169 |
| 2015/0361265 A1 * | 12/2015 | Isago | C08L 27/18 |
| | | | 525/102 |

FOREIGN PATENT DOCUMENTS

| | | |
|---|---|---|
| EP | 860436 A1 | 8/1998 |
| EP | 2949705 A1 | 12/2015 |
| WO | 9705122 A1 | 2/1997 |

\* cited by examiner

POLYMER ALLOY COMPRISING A SULPHUR-CONTAINING AROMATIC POLYMER AND A THERMOPLASTIC VULCANIZATE

CROSS-REFERENCE TO RELATED APPLICATIONS

This application is a U.S. national stage entry under 35 U.S.C. 071 of International Application No. PCT/EP2018/059995 filed Apr. 19, 2018, which claims priority to European application No. 17167521.8, filed on Apr. 21, 2017. The entire contents of these applications are explicitly incorporated herein by this reference.

TECHNICAL FIELD

The present invention relates to a polymer alloy comprising a sulphur-containing aromatic polymer and at least one thermoplastic vulcanizate which has an improved dispersibility, to a process for the preparation thereof and to articles comprising the same.

BACKGROUND ART

Sulphur-containing aromatic polymer such as polyarylene sulfides and polyarylsulfones are thermally stable engineering plastics consisting mainly of phenyl or biphenyl groups linked by sulfide, ether and/or sulfone groups. Those materials have excellent heat resistance and chemical resistance. However, they have poor mechanical properties, in particular impact resistance.

There has long been interest in improving the mechanical properties of sulphur-containing aromatic polymers.

Blending sulphur-containing aromatic polymers with fluorine-containing polymers can produce novel materials combining the performances and properties of both classes.

It has already been proposed to mix polyphenylene sulfide (PPS) with a fluorine-containing thermoplastic elastomer with the aim of improving the properties of said polyphenylene sulphide.

For instance, EP2949705 (TORAY INDUSTRIES, INC) discloses certain blends of polyphenylene sulfide with at least one fluororesin such as a tetrafluoroethylene/hexafluoropropylene copolymer or a tetrafluoroethylene/perfluoro (alkyl vinyl ether) copolymer. Such blends show improved physical and mechanical properties.

Blends of sulphur-containing aromatic polymers with fluorine-containing polymers tend however to have morphology with large regions or domains of the individual polymers rather than fine, well-dispersed domains. The large domains tend to produce a material with poor mechanical properties, e.g. injection molded parts having poor tensile properties.

Thermoplastic vulcanizates are vulcanized thermoplastic elastomers where cross-linked rubber forms a dispersed, particulate, elastomeric phase within a thermoplastic phase of a stiff thermoplastic such that thermoplastic properties are achieved. Thermoplastic vulcanizates are conventionally produced by dynamic crosslinking whereby a rubber component is crosslinked, or vulcanized, under intensive shear and mixing conditions within a blend of at least one non-vulcanizing thermoplastic polymer component at or above the melting point of that thermoplastic. Typically, the rubber component forms cross-linked, elastomeric particles dispersed uniformly in the thermoplastic.

Within this frame, U.S. Pat. No. 5,470,901 (DAIKIN INDUSTRIES LTD.) discloses the preparation of a resin including a thermoplastic polyphenylene sulfide and a fluorine-containing elastomer, said resin being prepared by a dynamic crosslinking method that comprises melt mixing a polyphenylene sulfide with a terpolymer of vinilydene fluoride, hexafluoropropylene and tetrafluoroethylene at a temperature of about 300° C. in the presence of a crosslinking agent and a crosslinking aid. The polyphenylene sulfide resin thus obtained is characterized by an improved impact strength in comparison with blends of PPS with the fluorine-containing elastomer which have not been crosslinked. However, in order to obtain an improved impact strength and a suitable stiffness, a high amount of glass fibers are added to the resin during the process.

Thermoplastic vulcanizates (TPV) including both a thermoplastic fluorinated polymer continuous phase and fluorine-containing elastomer dispersed phase have attracted great deal of attention for providing high level of chemical resistance with the advantages of thermoplastic processability.

The Applicant has surprisingly found that certain thermoplastic vulcanizates including both a thermoplastic fluorinated polymer continuous phase and fluorine-containing elastomer dispersed phase can be blended with sulphur-containing aromatic polymers to produce alloys wherein the components of the alloys are uniformly dispersed. The polymer alloys thus obtained are characterized by having improved mechanical properties.

SUMMARY OF INVENTION

A first object of the present invention provides a polymer alloy (PA) comprising:
(a) a sulphur-containing aromatic polymer [aromatic polymer (A)]; and
(b) a thermoplastic vulcanizate fluorine-containing composition [vulcanizate (C)] comprising a continuous thermoplastic fluoropolymer phase and a dispersed vulcanized fluoroelastomer phase, said composition comprising:
  i) at least one thermoplastic fluoropolymer [polymer (F)]; and
  ii) at least one (per)fluoroelastomer [elastomer (E)].

The Applicant has also surprisingly found that the compatibilization of the components of the polymer alloy can further significantly be improved by the addition of a copolymer (CO) comprising recurring units derived from vinylidene fluoride (VDF) and recurring units derived from chlorotrifluoroethylene (CTFE).

A second object of the present invention thus provides a polymer alloy (PA) as above defined which further comprises:
(c) a copolymer [copolymer (CO)] comprising recurring units derived from vinylidene fluoride (VDF) and recurring units derived from chlorotrifluoroethylene (CTFE).

Another object of the present invention provides a process for preparing the polymer alloy according to the objects as above defined.

In a further object, the present invention is directed to articles made of said polymer alloy.

DESCRIPTION OF EMBODIMENTS

Aromatic Polymer (A)

Aromatic polymer (A) to be used in the present invention may be a poly(arylene sulfide) (PAS) or an aromatic sulfone polymer (SP). PASs are polymers comprising the repeating unit of the formula —(Ar—S)— as the main structural unit, preferably containing the repeating unit in an amount of 80 mol % or more. Ar represents an aromatic group, and examples include units (RU1) represented by the formulas (I) to (XI) given below, among which the formula (I) is particularly preferred:

wherein R1 and R2 each represent a substituent selected from hydrogen, alkyl of 1 to 12 carbon atoms, alkoxy of 1 to 12 carbon atoms, arylene of 6 to 24 carbon atoms, and halogen, and R1 and R2 may be the same or different.

Accordingly, poly(arylene sulfide) (PAS) is preferably polyphenylene sulfide (PPS).

For the purposes of the present invention, the definition "aromatic sulfone polymer (SP)" is intended to denote any polymer of which more than 50 by weight %, preferably more than 70 by weight %, more preferably more than 90 by weight %, of recurring units (RU2) comprise at least one group of formula (XII):

Ar' being a group chosen among the following structures:

-continued with $R_D$ being:

with n=integer from 1 to 6.

The recurring units (RU2) are preferably chosen from:

(XIII)

(XIV)

(XV)

Accordingly, aromatic sulfone polymer (SP) is preferably chosen among the group consisting of polysulfone (PSU), polyphenylsulfone (PPSU), polyethersulfone (PESU), copolymers and mixtures thereof and is most preferably a polysulfone (PSU) or polyphenylsulfone (PPSU).

Polysulfone is notably available as UDEL® PSU from Solvay Specialty Polymers USA, L.L.C.

UDEL® polysulfone is made by condensing bisphenol A and 4,4'-dichlorodiphenyl sulfone.

Polyphenylsulfone is notably available as RADEL® R from SOLVAY ADVANCED POLYMERS, L.L.C and is made by reacting units of 4,4'-dichlorodiphenyl sulfone and 4,4'-biphenol.

Methods well known in the art are for instance those described in documents U.S. Pat. Nos. 3,634,355; 4,008,203; 4,108,837 and 4,175,175, the whole content of which is incorporated herein by reference.

The amount of aromatic polymer (A) in the polymer alloy is comprised between 50 and 90 parts by weight, preferably between 60 and 80 parts by weight, per 100 parts by weight of polymer alloy.

Vulcanizate (C)

Vulcanizate (C) to be used in the present invention is a thermoplastic vulcanizate fluorine-containing composition comprising a continuous thermoplastic fluoropolymer phase and a dispersed vulcanized fluoroelastomer phase.

Polymer (F) is a thermoplastic, that is to say a polymer which softens on heating and hardens on cooling at room temperature, which at room temperature exists below its glass transition temperature if fully amorphous or below its melting point if semi-crystalline.

It is nevertheless generally preferred for the polymer (F) to be semi-crystalline, that is to say to have a definite melting point; preferred polymers (F) are those possessing a heat of fusion of at least 5 J/g, preferably of at least 10 J/g, more preferably at least 30 J/g. Without upper limit for heat of fusion being critical, it is nevertheless understood that polymer (F) will generally possess a heat of fusion of at most 55 J/g, preferably of at most 53 J/g, more preferably of at most 50 J/g.

Heat of fusion is generally determined by DSC according to ASTM D3418 standard.

Polymer (F) is fluorinated, that is to say it comprises recurring units derived from at least one fluorinated monomer [monomer (MF)].

The polymer (F) is preferably a partially fluorinated fluoropolymer.

For the purpose of the present invention, the term "partially fluorinated fluoropolymer" is intended to denote a polymer comprising recurring units derived from at least one fluorinated monomer, wherein at least one of said fluorinated monomers comprise at least one hydrogen atom.

By the term "fluorinated monomer (MF)" it is hereby intended to denote an ethylenically unsaturated monomer comprising at least one fluorine atom.

The term "at least one fluorinated monomer (MF)" is understood to mean that the polymer (F) may comprise recurring units derived from one or more than one fluorinated monomers (MF).

The monomer (MF) is generally selected from the group consisting of:

(a) $C_2$-$C_8$ perfluoroolefins, such as tetrafluoroethylene, and hexafluoropropene;

(b) $C_2$-$C_8$ hydrogenated fluoroolefins, such as vinyl fluoride, 1,2-difluoroethylene, vinylidene fluoride and trifluoroethylene;

(c) perfluoroalkylethylenes complying with formula $CH_2$=CH—$R_{f0}$, in which $R_{f0}$ is a $C_1$-$C_6$ perfluoroalkyl;

(d) chloro- and/or bromo- and/or iodo-$C_2$-$C_6$ fluoroolefins, like chlorotrifluoroethylene;

(e) (per)fluoroalkylvinylethers complying with formula $CF_2$=CFOR$_{f1}$ in which $R_{f1}$ is a $C_1$-$C_6$ fluoro- or perfluoroalkyl, e.g. $CF_3$, $C_2F_5$, $C_3F_7$;

(f) $CF_2$=CFOX$_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;

(g) (per)fluoroalkylvinylethers complying with formula $CF_2$=CFOCF$_2$OR$_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like —$C_2F_5$—O—$CF_3$;

(h) functional (per)fluoro-oxyalkylvinylethers complying with formula $CF_2$=CFOY$_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;

(i) fluorodioxoles, of formula (I):

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

According to a first embodiment of the invention, the polymer (F) is a partially fluorinated fluoropolymer comprising recurring units derived from vinylidene fluoride (VDF), and, optionally, recurring units derived from at least one fluorinated monomer different from VDF.

The polymer (F) of this first preferred embodiment of the invention more preferably comprises:
- at least 60% by moles, preferably at least 75% by moles, more preferably at least 85% by moles of recurring units derived from vinylidene fluoride (VDF),
- optionally, from 0.1% to 15% by moles, preferably from 0.1% to 12% by moles, more preferably from 0.1% to 10% by moles of recurring units derived from at least one fluorinated monomer different from VDF, all the aforementioned % by moles being referred to the total moles of recurring units of the polymer (F).

The said fluorinated monomer different from VDF is advantageously selected from vinyl fluoride (VF1), chlorotrifluoroethylene (CTFE), hexafluoropropylene (HFP), tetrafluoroethylene (TFE), trifluoroethylene (TrFE) and perfluoromethylvinylether (PMVE).

As non-limitative examples of polymers (F) useful in the present invention, mention can be notably made of homopolymers of VDF, VDF/TFE copolymers, VDF/CTFE copolymers and the like.

VDF homopolymers are particularly advantageous for being used as polymer (F) in the vulcanizate (C).

The polymer (F) is typically obtainable by emulsion polymerization or suspension polymerization.

The melt index of the polymer (F) is advantageously at least 0.01, preferably at least 0.05, more preferably at least 0.1 g/10 min and advantageously less than 50, preferably less than 30, more preferably less than 20 g/10 min, when measured in accordance with ASTM test No. 1238, run at 230° C., under a piston load of 2.16 kg.

The melt index of the polymer (F) is advantageously at least 1, preferably at least 2, more preferably at least 5 g/10 min and advantageously less than 70, preferably less than 50, more preferably less than 40 g/10 min, when measured in accordance with ASTM test No. 1238, run at 230° C., under a piston load of 5 kg.

The polymer (F) has advantageously a melting point ($T_{m2}$) advantageously of at least 120° C., preferably at least 125° C., more preferably at least 130° C. and of at most 190° C., preferably at most 185° C., more preferably at most 180° C., when determined by DSC, at a heating rate of 10° C./min, according to ASTM D 3418.

For the purposes of this invention, the term "(per)fluoroelastomer [elastomer (E)]" is intended to designate a fluoropolymer resin serving as a base constituent for obtaining a true elastomer, said fluoropolymer resin comprising more than 10% by weight, preferably more than 30% by weight, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Non limitative examples of suitable (per)fluorinated monomers are notably:
- $C_2$-$C_8$ fluoro- and/or perfluoroolefins, such as tetrafluoroethylene (TFE), hexafluoropropene (HFP), pentafluoropropylene, and hexafluoroisobutylene;
- $C_2$-$C_8$ hydrogenated monofluoroolefins, such as vinyl fluoride, 1,2-difluoroethylene, vinylidene fluoride (VDF) and trifluoroethylene (TrFE);
- (per)fluoroalkylethylenes complying with formula $CH_2=CH-R_{f0}$, in which $R_{f0}$ is a $C_1$-$C_6$ (per)fluoroalkyl or a $C_1$-$C_6$ (per)fluorooxyalkyl having one or more ether groups;
- chloro- and/or bromo- and/or iodo-$C_2$-$C_6$ fluoroolefins, like chlorotrifluoroethylene (CTFE);
- fluoroalkylvinylethers complying with formula $CF_2=CFOR_{f1}$ in which $R_{f1}$ is a $C_1$-$C_6$ fluoro- or perfluoroalkyl, e.g. —$CF_3$, —$C_2F_5$, —$C_3F_7$;
- hydrofluoroalkylvinylethers complying with formula $CH_2=CFOR_{f1}$ in which $R_{f1}$ is a $C_1$-$C_6$ fluoro- or perfluoroalkyl, e.g. —$CF_3$, —$C_2F_5$, —$C_3F_7$;
- fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;
- fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;
- functional fluoro-alkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;
- fluorodioxoles, of formula:

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Examples of hydrogenated monomers are notably hydrogenated alpha-olefins, including ethylene, propylene, 1-butene, diene monomers, styrene monomers, alpha-olefins being typically used.

Elastomers (E) are in general amorphous products or products having a low degree of crystallinity (crystalline phase less than 20% by volume) and a glass transition temperature ($T_g$) below room temperature. In most cases, the (per)fluoroelastomer has advantageously a $T_g$ below 10° C., preferably below 5° C., more preferably 0° C.

Elastomer (E) is preferably selected among:
(1) VDF-based copolymers, in which VDF is copolymerized with at least one comonomer selected from the group consisting of the followings classes, with the provision that such comonomer is different from VDF:

(a1) $C_2$-$C_8$ perfluoroolefins, such as tetrafluoroethylene (TFE), hexafluoropropylene (HFP), hexafluoroisobutylene;

(b1) hydrogen-containing $C_2$-$C_8$ olefins, such as $C_2$-$C_8$ non-fluorinated olefins (Ol); $C_2$-$C_8$ partially fluorinated olefins, vinyl fluoride (VF), trifluoroethylene (TrFE), perfluoroalkyl ethylenes of formula $CH_2=CH-R_f$, wherein $R_f$ is a $C_1$-$C_6$ perfluoroalkyl group;

(c1) $C_2$-$C_8$ chloro and/or bromo and/or iodo-fluoroolefins such as chlorotrifluoroethylene (CTFE);

(d1) (per)fluoroalkylvinylethers of formula $CF_2=CFOR_f$, wherein $R_f$ is a $C_1$-$C_6$ (per)fluoroalkyl group; preferably perfluoroalkylvinylethers (PAVE) of above formula wherein $R_f$ is $C_1$-$C_6$ perfluoroalkyl group, e.g. $CF_3$, $C_2F_5$, $C_3F_7$;

(e1) (per)fluoro-oxy-alkylvinylethers of formula $CF_2=CFOX$, wherein X is a $C_1$-$C_{12}$ ((per)fluoro)-oxyalkyl comprising catenary oxygen atoms, e.g. the perfluoro-2-propoxypropyl group;

(f1) (per)fluorodioxoles having formula:

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably $-CF_3$, $-C_2F_5$, $-C_3F_7$, $-OCF_3$, $-OCF_2CF_2OCF_3$; preferably, perfluorodioxoles;

(g1) (per)fluoro-methoxy-vinylethers (MOVE, hereinafter) having formula:

wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X^2=F$, H; preferably $X^2$ is F and $R''_f$ is $-CF_2CF_3$ (MOVE1); $-CF_2CF_2OCF_3$ (MOVE2); or $-CF_3$ (MOVE3);

(h1) $C_2$-$C_8$ non-fluorinated olefins (Ol), for example ethylene and propylene; and (2) TFE-based copolymers, in which TFE is copolymerized with at least one comonomer selected from the group consisting of the classes (a1), (c1), (d1), (e1), (g1), (h1), and class (i2) below, with the provision that such comonomer is different from TFE:

(i2) perfluorovinyl ethers containing cyanide groups, such as notably those described in U.S. Pat. Nos. 4,281,092, 5,447,993 and 5,789,489.

Most preferred elastomers (E) are those having following compositions (in mol %):

(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%;

(ii) vinylidene fluoride (VDF) 50-80%, perfluoroalkyl vinyl ethers (PAVE) 5-50%, tetrafluoroethylene (TFE) 0-20%;

(iii) vinylidene fluoride (VDF) 20-30%, $C_2$-$C_8$ non-fluorinated olefins (Ol) 10-30%, hexafluoropropene (HFP) and/or perfluoroalkyl vinyl ethers (PAVE) 18-27%, tetrafluoroethylene (TFE) 10-30%;

(iv) tetrafluoroethylene (TFE) 50-80%, perfluoroalkyl vinyl ethers (PAVE) 20-50%;

(v) tetrafluoroethylene (TFE) 45-65%, $C_2$-$C_8$ non-fluorinated olefins (Ol) 20-55%, vinylidene fluoride 0-30%;

(vi) tetrafluoroethylene (TFE) 32-60% mol %, $C_2$-$C_8$ non-fluorinated olefins (Ol) 10-40%, perfluoroalkyl vinyl ethers (PAVE) 20-40%, fluorovinyl ethers (MOVE) 0-30%;

(vii) tetrafluoroethylene (TFE) 33-75%, perfluoroalkyl vinyl ethers (PAVE) 15-45%, vinylidene fluoride (VDF) 5-30%, hexafluoropropene HFP 0-30%;

(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%;

(ix) tetrafluoroethylene (TFE) 20-70%, fluorovinyl ethers (MOVE) 30-80%, perfluoroalkyl vinyl ethers (PAVE) 0-50%.

Optionally, elastomer (E) also comprises recurring units derived from a bis-olefin [bis-olefin (OF)] having general formula:

wherein $R_1$, $R_2$, $R_3$, $R_4$, $R_5$ and $R_6$, equal to or different from each other, are H, halogen, a group $R_{Alk}$ or $OR_{Alk}$, wherein $R_{Alk}$ is a branched or straight chain alkyl radical which can be partially, substantially or completely fluorinated or chlorinated; Z is a linear or branched $C_1$-$C_{18}$ alkylene or cycloalkylene radical, optionally containing oxygen atoms, preferably at least partially fluorinated, or a (per)fluoropolyoxyalkylene radical, e.g. as described in EP 661304 A (AUSIMONT SPA) Jul. 5, 1995.

The bis-olefin (OF) is preferably selected from the group consisting of those complying with formulae (OF-1), (OF-2) and (OF-3):

(OF-1)

wherein j is an integer between 2 and 10, preferably between 4 and 8, and R1, R2, R3, R4, equal or different from each other, are H, F or $C_{1-5}$ alkyl or (per)fluoroalkyl group;

(OF-2)

wherein each of A, equal or different from each other and at each occurrence, is independently selected from F, Cl, and H; each of B, equal or different from each other and at each occurrence, is independently selected from F, Cl, H and ORB, wherein RB is a branched or straight chain alkyl radical which can be partially, substantially or completely fluorinated or chlorinated; E is a divalent group having 2 to 10 carbon atom, optionally fluorinated, which may be inserted with ether linkages; preferably E is a —(CF$_2$)$_m$— group, with m being an integer from 3 to 5; a preferred bis-olefin of (OF-2) type is F$_2$C=CF—O—(CF$_2$)$_5$—O—CF=CF$_2$.

(OF-3)

wherein E, A and B have the same meaning as above defined; R5, R6, R7, equal or different from each other, are H, F or C$_{1-5}$ alkyl or (per)fluoroalkyl group.

The weight ratio between polymer (F) and elastomer (E) is not particularly critical, provided that is selected by routine experiments so as to deliver a continuous thermoplastic fluoropolymer phase and a dispersed vulcanized fluoroelastomer phase in the vulcanizate (C). Generally the weight ratio polymer (F)/elastomer (E) will be comprised between 10/90 wt/wt to 70/30 wt/wt, preferably 20/80 to 40/60 wt/wt. The skilled in the art will select most appropriate weight ratio in view of target final properties of the vulcanizate (C).

In one embodiment of the invention, the vulcanizate (C) further comprises at least one plasticizer (P), preferably an organic ester plasticizer.

Preferred organic ester plasticizers are those characterized by a low volatility, wherein the term "low volatility" as used herein is intended to describe organic esters having a boiling point at atmospheric pressure of above about 300° C.

In a preferred embodiment, the organic ester plasticizers are aliphatic di- or tri-esters.

Particularly suitable organic esters include esters of citric acid and esters of sebacic acid.

In a preferred embodiment of the present invention the vulcanizate (C) comprises:
  i) at least one thermoplastic fluoropolymer [polymer (F)];
  ii) at least one (per)fluoroelastomer [elastomer (E)]; and
  iii) at least one organic ester plasticizer [plasticizer (P)] selected from the group consisting of esters of citric acid and esters of sebacic acid.

In most preferred embodiments, the ester of citric acid is tributyl O-acetyl citrate and the ester of sebacic acid is dibutyl sebacate. Still more preferably, the plasticizer (P) is tributyl O-acetyl citrate.

The plasticizer (P) is present in the vulcanizate (C) in an amount of from 1 to 50% by weight, preferably of from 4 to 30% by weight, more preferably of from 5 to 20% by weight, based on the weight of polymer (F).

Still, the vulcanizate (C) may comprise additional optional ingredients, such as extender oils, synthetic processing oils, stabilizers, at least one processing aid, fillers, pigments, adhesives, tackifiers, and waxes. Such additional ingredients might be blended into the precursor mixture (M), or can be later compounded into the vulcanizate (C) after dynamic curing.

Vulcanizate (C) can be prepared by dynamic curing of a mixture (M), said mixture comprising:
  i) at least one thermoplastic fluoropolymer [polymer (F)], as above detailed;
  ii) at least one (per)fluoroelastomer [elastomer (E)], as above detailed,
  iii) optionally at least one organic ester plasticizer [plasticizer (P)] selected from organic esters, as above detailed; and
  iv) at least one curing system for the elastomer (E).

For obtaining the vulcanizate (C), the mixture (M) is submitted to dynamic curing.

It is thus understood that the vulcanizate (C) may thus additional comprise residues or decompositions products derived from said curing system.

The curing system can be effective for ionic curing, both based on polyhydroxylated or polyaminic compounds, peroxide curing and/or mixed curing of the elastomer (E).

The amount of the curing system is not particularly limited, provided that is present in an amount effective to ensure crosslinking of the elastomer (E) within the vulcanizate (C).

A curing system for peroxide curing generally comprises at least one peroxide (generally, an organic peroxide) that is capable of generating radicals by thermal decomposition, in an amount generally of between 0.1 and 10 and preferably between 0.5 and 5 weight parts per hundred parts of the elastomer (E). Among most commonly used agents, mention can be made of: dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl] carbonate.

Further, in addition, the curing system for peroxide curing comprises: (a) at least one curing co-agent, in an amount generally of between in an amount generally of between 0.5 and 10 and preferably between 1 and 7 weight parts per hundred parts of the elastomer (E); among these coagents, the following are commonly used: triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl methyltrisiloxane; bis-olefins (OF), as above detailed; triazines, such as notably those described in European patent applications EP 860436 A (AUSIMONT SPA) Aug. 26, 1998 and WO 97/05122 (DUPONT DE NEMOURS) Feb. 13, 1997; among above mentioned curing co-agents, bis-olefins (OF), as above detailed, and more specifically those of formula (OF-1), as above detailed, have been found to provide particularly good results;

(b) optionally, a metallic compound, in an amounts of advantageously 1 to 15 and preferably 2 to 10 weight parts per hundred parts of the elastomer (E), selected from the group consisting of oxides and hydroxides of divalent metals, for instance Mg, Zn, Ca or Pb, optionally combined with a salt of a weak acid, for instance Ba, Na, K, Pb, Ca stearates, benzoates, carbonates, oxalates or phosphites;

(c) optionally, acid acceptors of the metal non-oxide type, such as 1,8-bis(dimethylamino)naphthalene, octadecylamine, etc.

When the vulcanizate (C) is obtained by peroxide curing, elastomer (E) preferably contains iodine and/or bromine atoms in the chain and/or at the end of the macromolecules. The introduction of these iodine and/or bromine atoms may be obtained:
  by addition during elastomer (E) manufacture to the polymerization medium of brominated and/or iodinated cure-site comonomers, such as bromo and/or iodo olefins containing from 2 to 10 carbon atoms, or iodo and/or bromo fluoroalkyl vinyl ethers, in amounts such that the content of cure-site comonomers in the elastomer (E) is generally between 0.05 and 2 mol per 100 mol of the other base monomer units; or via addition during elastomer (E) manufacture of iodinated and/or brominated chain-transfer agent(s) to the polymerization medium, for instance compounds of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ or alkali metal or alkaline-earth metal iodides and/or bromides.

A curing system for ionic curing generally comprises at least one curing agent and at least one accelerator, as well known in the art.

The amount of accelerator(s) is generally comprised between 0.05 and 5 weight parts per hundred parts of elastomer (E) (phr) and that of the curing agent typically between 0.5 and 15 phr and preferably between 1 and 6 phr.

Aromatic or aliphatic polyhydroxylated compounds, or derivatives thereof, may be used as curing agents. Among these, mention will be made in particular of dihydroxy, trihydroxy and tetrahydroxy benzenes, naphthalenes or anthracenes; bisphenols, in which the two aromatic rings are linked together via an aliphatic, cycloaliphatic or aromatic divalent radical, or alternatively via an oxygen or sulphur atom, or else a carbonyl group. The aromatic rings may be substituted with one or more chlorine, fluorine or bromine atoms, or with carbonyl, alkyl or acyl groups. Bisphenol AF is particularly preferred.

Examples of accelerators that may be used include: quaternary ammonium or phosphonium salts; aminophosphonium salts; phosphoranes; the imine compounds; etc. Quaternary phosphonium salts and aminophosphonium salts are preferred.

Instead of using the accelerator and the curing agent separately, it is also possible for the curing system for ionic curing to comprise an adduct between an accelerator and a curing agent in a mole ratio of from 1:2 to 1:5 and preferably from 1:3 to 1:5, the accelerator being one of the organic onium compounds having a positive charge, as defined above, and the curing agent being chosen from the compounds indicated above, in particular dihydroxy or polyhydroxy or dithiol or polythiol compounds; the adduct being obtained by melting the product of reaction between the accelerator and the curing agent in the indicated mole ratios, or by melting the mixture of the 1:1 adduct supplemented with the curing agent in the indicated amounts. Optionally, an excess of the accelerator, relative to that contained in the adduct, may also be present.

The following are particularly preferred as cations for the preparation of the adduct: 1,1-diphenyl-1-benzyl-N-diethylphosphoranamine and tetrabutylphosphonium; particularly preferred anions are bisphenol compounds in which the two aromatic rings are bonded via a divalent radical chosen from perfluoroalkyl groups of 3 to 7 carbon atoms, and the OH groups are in the para position.

Other ingredients optionally comprised in the curing system for ionic curing are:

I) one or more mineral acid acceptors, generally chosen from those known in the ionic curing of elastomers, preferably selected from the group consisting of oxides of divalent metals, preferably oxides of Mg, Zn, Ca or Pb, typically comprised in amounts of 1-40 phr of elastomer (A);

II) one or more basic compounds chosen from those known in the ionic curing of elastomers, commonly selected from the group consisting of hydroxides of divalent metals (preferably: $Ca(OH)_2$, $Sr(OH)_2$, $Ba(OH)_2$), metal salts of weak acids, for instance Ca, Sr, Ba, Na and K carbonates, benzoates, oxalates and phosphites and mixtures of the above mentioned hydroxides with the above mentioned metal salts, typically added in amounts of from 0.5 to 10 phr of elastomer (E).

The Applicant has surprisingly found that the vulcanizate (C) can be used for preparing polymer alloys comprising a sulphur-containing aromatic polymer and a vulcanizate (C) in all proportions by weight, wherein the components of the alloy are uniformly dispersed.

It has in fact been observed that after melt mixing a blend of vulcanizate (C) and sulphur-containing aromatic polymer at a temperature which is above the temperature where all the components are in the molten form, a plurality of discrete domains dispersed within a continuous phase is formed, wherein the dimension of the particle size of said discrete domains is markedly decreased in comparison with the blend before melt mixing.

It has in fact been observed that after melt mixing a blend of vulcanizate (C) and a sulphur-containing aromatic polymer at a temperature which is above the temperature where all the components are in the molten form a marked decrease in the dimension of the domains of the components occurs.

The average particle size of the discrete domains in the polymer alloy of the present invention is conveniently less than 2 microns, preferably less than 1 micron, more preferably less than 0.5 microns.

The average particle size of the components in the polymer alloy of the present invention can be measured by Scanning Electron Microscopy on the freeze fractured blend obtained after melt mixing the blend above the temperature where all the components are in the molten form, as the average over 100 particles obtained by analyzing pictures at about 1000× magnification.

The polymer alloy (PA) according to this first object may comprise:

(a) from 1 to 99% by weight of aromatic polymer (A); and
(b) from 1 to 99% by weight of vulcanizate (C),
all the aforementioned percentages by weight being referred to the total weight of polymer alloy (PA).

In one aspect, the present invention provides a polymer alloy comprising a continuous phase of a sulphur-containing aromatic polymer [aromatic polymer (A)] and discrete domains of a vulcanizate (C).

In a preferred embodiment according to this first aspect, the present invention provides a polymer alloy (PA) which comprises:

(a) from 60 to 90%, preferably from 75 to 85%, more preferably from 70 to 80% by weight of aromatic polymer (A); and
(b) from 10 to 40%, preferably from 15 to 25%, more preferably from 20 to 30% by weight of vulcanizate (C), all the aforementioned percentages by weight being referred to the total weight of polymer alloy (PA).

In a second aspect, the present invention provides a polymer alloy comprising a continuous phase of a vulcanizate (C) and discrete domains of a sulphur-containing aromatic polymer [aromatic polymer (A)].

In a preferred embodiment according to this second aspect, the present invention provides a polymer alloy (PA) which comprises:

(a) from 10 to 40%, preferably from 15 to 25% by weight of aromatic polymer (A); and
(b) from 60 to 90%, preferably from 75 to 85% by weight of vulcanizate (C),
all the aforementioned percentages by weight being referred to the total weight of polymer alloy (PA).

The Applicant has also surprisingly found that the addition of a copolymer (CO) comprising recurring units derived from vinylidene fluoride (VDF) and recurring units derived from chlorotrifluoroethylene (CTFE) can be used to further significantly improve the compatibilization of the components of the polymer alloy in all proportions by weight, thus allowing the preparation of polymer alloys comprising the components uniformly dispersed therein.

Mixing a vulcanizate (C) and a sulphur-containing aromatic polymer in the presence of certain amounts of a copolymer (CO) at a temperature which is above the temperature where all the components are in the molten form results in fact in a uniformly dispersed alloy wherein dispersed domains of reduced average particle size are dispersed within a continuous phase.

Without wishing to be bound to any theory, it is believed that melt mixing a sulphur-containing aromatic polymer with a copolymer (CO) gives a chemically linked fluorinated-aromatic moiety which acts as an in-situ-generated compatibilizer.

Copolymer (CO)

Copolymer (CO) preferably comprises recurring units derived:
- from VDF in an amount from 50 to 90% by moles with respect to the total moles of recurring units of copolymer (CO); and
- from CTFE in an amount 5 to 20% by moles of CTFE with respect to the total moles of recurring units of copolymer (CO).

Recurring units of at least another fluorinated monomer (MF) as above defined, different from vinylidene fluoride and from chlorotrifluoroethylene may be included in copolymer (CO).

The fluorinated monomer (MF) optionally present in copolymer (CO) is preferably hexafluoropropylene (HFP).

The amount of fluorinated monomer (MF) in copolymer (CO) is preferably of at least 2.5% by moles, preferably at least 4.0% by moles, even more preferably at least 6.0% by moles with respect to the total moles of recurring units of copolymer (CO).

Melt flow rate of the copolymers (CO), measured following the procedure of ASTM D1238, ranges generally from 1 to 50 g/10 min.

In a preferred embodiment, copolymer (CO) comprises, or preferably consists of, recurring units derived:
- from 50 to 90% by moles of VDF;
- from 5 to 20% by moles of CTFE;
- from 10 to 30% by moles of a fluorinated monomer (MF), different from vinylidene fluoride and from chlorotrifluoroethylene, all the aforementioned percentages by moles being referred to the total moles of recurring units of copolymer (CO).

According to a second object of the present invention, it is thus provided a polymer alloy (PA) comprising the following components:
 (a) a sulphur-containing aromatic polymer [aromatic polymer (A)];
 (b) a thermoplastic vulcanizate fluorine-containing composition [vulcanizate (C)] comprising:
   i) at least one thermoplastic fluoropolymer [polymer (F)];
   ii) at least one (per)fluoroelastomer [elastomer (E)]; and
 c) a copolymer [copolymer (CO)] comprising recurring units derived from vinylidene fluoride (VDF) and recurring units derived from chlorotrifluoroethylene (CTFE).

The copolymer (CO) in the polymer alloy according to this second object can be present in an amount comprised between 0.1 to 20% by weight, preferably from 1 to 10% by weight, more preferably from 2 to 5% by weight, with respect to the total weight of the polymer alloy (PA).

Thus, according to this second object it is provided a polymer alloy (PA) preferably comprising:
 (a) from 1 to 98.9% by weight of aromatic polymer (A);
 (b) from 1 to 98.9% by weight of a vulcanizate (C); and
 (c) from 0.1 to 20% by weigh, preferably from 1 to 10% by weight, more preferably from 2 to 5% by weight, of a copolymer (CO), all the aforementioned percentages by weight being referred to the total weight of polymer alloy (PA).

In one aspect of this second object, the present invention provides a polymer alloy comprising a continuous phase of an aromatic polymer (A) and discrete domains of a vulcanizate (C) and of a copolymer (CO).

In a preferred embodiment according to this aspect, the polymer alloy (PA) comprises:
 (a) from 60 to 90%, preferably from 70 to 80%, by weight of aromatic polymer (A);
 (b) from 9 to 39%, preferably from 15 to 35%, more preferably from 20 to 30% by weight of a vulcanizate (C); and
 (c) from 0.1 to 20% by weigh, preferably from 1 to 10% by weight, more preferably from 2 to 5% by weight, of a copolymer (CO),
all the aforementioned percentages by weight being referred to the total weight of polymer alloy (PA).

In a second aspect of this second object, the present invention provides a polymer alloy comprising a co-continuous phase of a vulcanizate (C) and of a copolymer (CO) and discrete domains of an aromatic polymer (A).

In a preferred embodiment according to this aspect, the polymer alloy (PA) comprises:
 (a) from 10 to 40%, preferably from 15 to 25% by weight of aromatic polymer (A);
 (b) from 59 to 89%, preferably from 75 to 85% by weight of a vulcanizate (C);
 (c) from 0.1 to 20% by weigh, preferably from 1 to 10% by weight, more preferably from 2 to 5% by weight, of a copolymer (CO),
all the aforementioned percentages by weight being referred to the total weight of polymer alloy (PA).

To further improve the mechanical properties of the polymer alloy, various additives like fillers and plasticizers, such as organic esters, may be added to the polymer alloy of the present invention. Examples of the fillers are glass fibers, asbestos fibers, silica fibers, silica-alumina fibers, alumina fibers, zirconia fibers, potassium titanate whiskers, polyamide fibers, polyphenol fibers, silica, talc, clay, mica, calcium carbonate, barium sulfate, titanium oxide, silicon nitride and the like.

In a further object, the present invention provides a process for preparing the polymer alloy (PA) as above defined, said process comprising melt mixing the components of the polymer alloy.

Melt mixing is carried out at a temperature where all the components are in the molten form, thus at a temperature above the glass transition temperature or above the melting temperature of all the components.

In the melt mixing procedure, the aromatic polymer (A) and the vulcanizate (C) and, optionally, the copolymer (CO), can be melted together, brought separately to their respective melting temperature and then mixed with each other, or subsequently added to a first melted polymer.

In a preferred embodiment according to the first object defined above, the melt mixing procedure is carried out by adding the vulcanizate (C) to the aromatic polymer (A) in the molten form.

In a preferred embodiment according to the second object defined above, the melt mixing procedure is carried out by adding the vulcanizate (C) and the copolymer (CO) to the aromatic polymer (A) in the molten form, mixing for few minutes.

The blend thus formed is allowed to stir for some minutes and allowed to cool to room temperature to provide the polymer alloy of the invention.

The polymer alloy of the present invention is preferably in the form of pellets.

The polymer alloy of the present invention has improved mechanical properties, in particular tensile properties, while maintaining the excellent properties of the parent polymers. Therefore, the polymer alloy of the present invention is suitably used in various fields including Automotive, Oil and Gas and Chemical Process Industry.

In a further object, therefore, the present invention provides an article comprising the polymer alloy as defined above. Preferably, the article according to the present invention can be a pipe or a piece of equipment formed by extrusion or molding technologies. Preferably, injection molding is used to obtain the wanted piece of equipment. Additionally, the articles of the present invention can be adhered to other articles by coextrusion or overmolding technologies.

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit the scope of the invention.

EXPERIMENTAL PART

Raw Materials
PPS: Polyphenylene sulfide, commercially available as Ryton® from Solvay.
POLYMER F=VDF homopolymer, commercially available as Solef® 6008 from Solvay.
ELASTOMER contains 100 parts by weight of a vinylidene fluoride/hexafluoropropylene/tetrafluoroethylene terpolymer having 68.5% fluorine content, 2.5 parts by weight of Bisphenol AF (CAS-No 1478-61-1), 0.5 part of Benzyl(diethylamino) diphenylphosphonium chloride (CAS-No 82857-68-9) and 0.4 parts by weight of benzyl-triphenylphosphonium chloride (CAS-No.: 1100-88-5).
VDF-co-CTFE: VDF copolymer comprising 9% by moles of CTFE recurring units.
Measurement of Particle Size
The average particles size the components of the polymer alloy is measured by SEM as the average over 100 particles obtained by analyzing pictures at about 1000× magnification.
Tensile Measurement (Elongation at Break)
Tensile measurements were carried out at 23° C. according to ASTM D638 specimen type V.
Measurement of Shear Storage Modulus (G')
The shear storage modulus (G') at 200° C. was measured according to ASTM D5279-13 (torsion bar geometry) for the PPS-containing alloys. For the TPV, it was measured according to ASTM D4440-15, (parallel plate geometry).

All the measurements were performed at a frequency of 6.28 rad/sec.

Example 1

A Thermoplastic vulcanizate (TPV) was prepared in two steps using a Brabender internal mixer EHT 50.

The first step consisted in the preparation of an elastomer masterbatch by adding 6 phr of calcium hydroxide and 3 phr of magnesium oxide to ELASTOMER. The elastomer masterbatch was prepared using elastomer blades, cooling the mixer to keep the temperature always below 70° C. The mixing time was twenty minutes.

In the second step, the internal mixer temperature was set at 200° C. About 18 grams of POLYMER F were poured into the mixer and melted for 5 minutes at 30 rpm. Then about 42 grams of the elastomer masterbatch prepared in the first step, cut in small pieces of 10-15 mm, were added. The mixing was continued for 20 more minutes, recording the torque and the temperature.

Finally, the TPV thus obtained was manually removed from the mixer and grinded in liquid nitrogen.

Example 2

A blend of PPS and the TPV prepared according to example 1 was prepared in an internal mixer at 310° C. using roller blades. About 53 grams of PPS were poured into the mixer and melted for 15 minutes at 30 rpm. Then, 18 gram of TPV were added and mixed at 70 rpm for 15 min. Finally, the mixture was manually removed from the mixer and grinded in liquid nitrogen.

Figure 1:
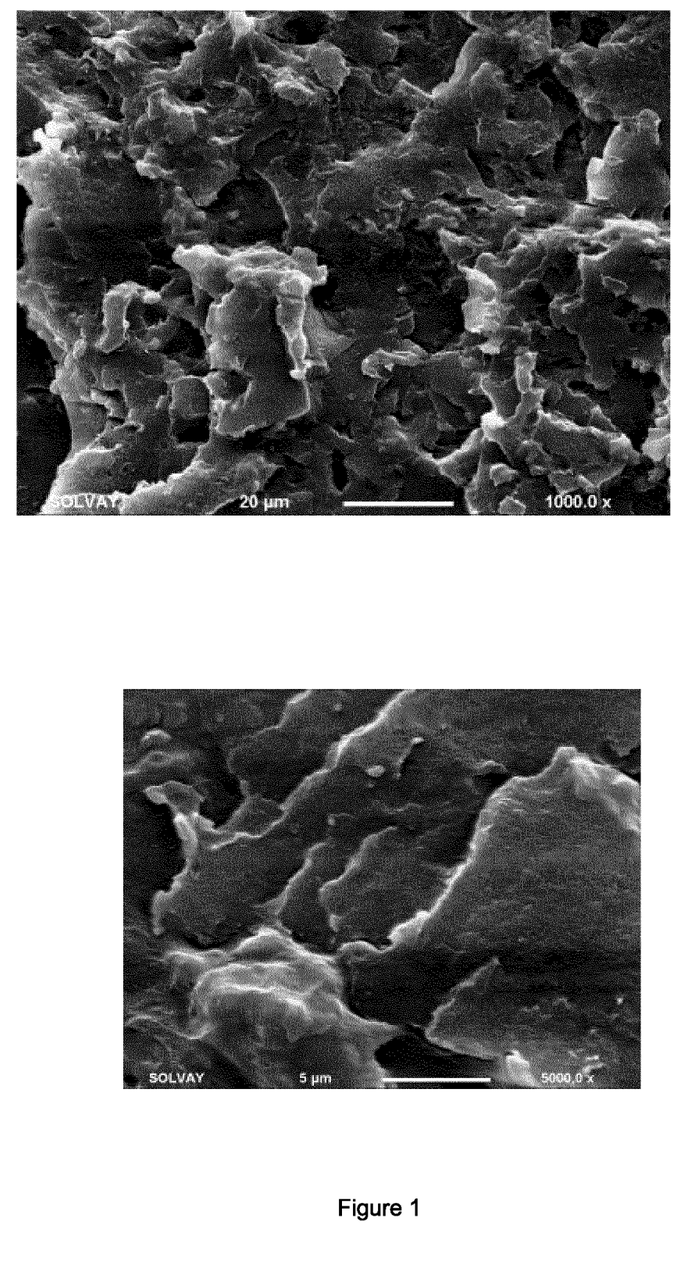
FIG. 1 shows the SEM image of the blend of Example 2 at a magnification of 1000.0× and 5000λ.

The SEM image of the blend obtained in Example 2 is shown in FIG. 1.

Example 3

A blend of PPS, the TPV prepared according to example 1 and VDF-co-CTFE was prepared in an internal mixer at 310° C. using roller blades. About 51 grams of PPS were poured into the mixer and melted for 15 minutes at 30 rpm. Then, a powder mixture containing 17 gram of TPV and 2 grams of VDF-co-CTFE was added into the mixer and mixed at 70 rpm for 15 min. Finally, the mixture was manually removed from the mixer and grinded in liquid nitrogen.

Figure 2:
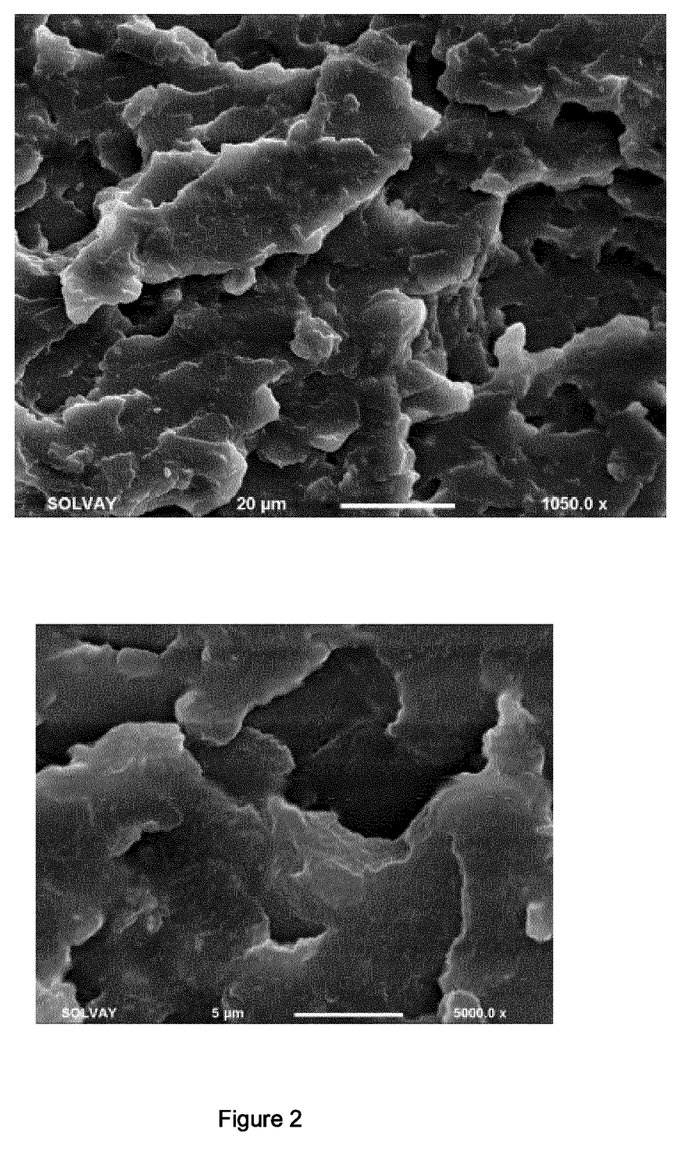
FIG. 2 shows the SEM image of the blend of Example 3 at a magnification of 1050.0× and 5000λ.

The SEM image of the blend obtained in Example 3 is shown in FIG. 2.

Example 4

A blend of PPS and the TPV prepared according to example 1 was prepared in an internal mixer at 310° C. using roller blades. About 35.5 grams of PPS were poured into the mixer and melted for 15 minutes at 30 rpm. Then, 35.5 grams of TPV were added and mixed at 70 rpm for 15 min. Finally, the mixture was manually removed from the mixer and grinded in liquid nitrogen.

Example 5

A blend of PPS and the TPV prepared according to example 1 was prepared in an internal mixer at 310° C. using roller blades. About 18 grams of PPS were poured into the mixer and melted for 15 minutes at 30 rpm. Then, 53 gram of TPV were added and mixed at 70 rpm for 15 min. Finally, the mixture was manually removed from the mixer and grinded in liquid nitrogen.

Figure 3:
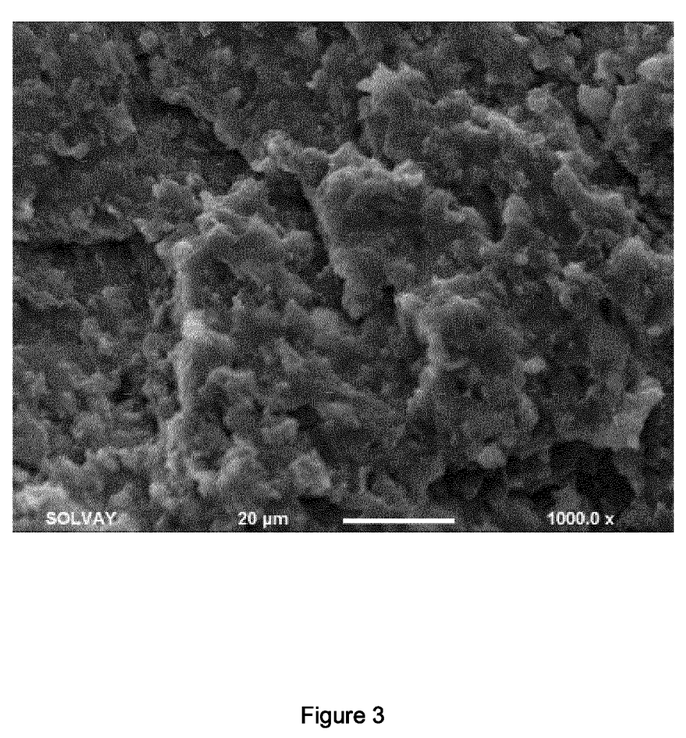
FIG. 3 shows the SEM image of the blend of Example 5 at a magnification of 1000.0× and at a magnification of 7960.0λ.

The SEM image of the blend obtained in Example 5 is shown in FIG. 3.

Example 6

A blend of PPS, the TPV prepared according to example 1 and VDF-co-CTFE was prepared in an internal mixer at 310° C. using roller blades. About 17 grams of PPS were poured into the mixer and melted for 15 minutes at 30 rpm. Then, a powder mixture containing 51 gram of TPV and 2 grams of VDF-co-CTFE were added and mixed at 70 rpm for 15 min. Finally, the mixture was manually removed from the mixer and grinded in liquid nitrogen.

Figure 4:
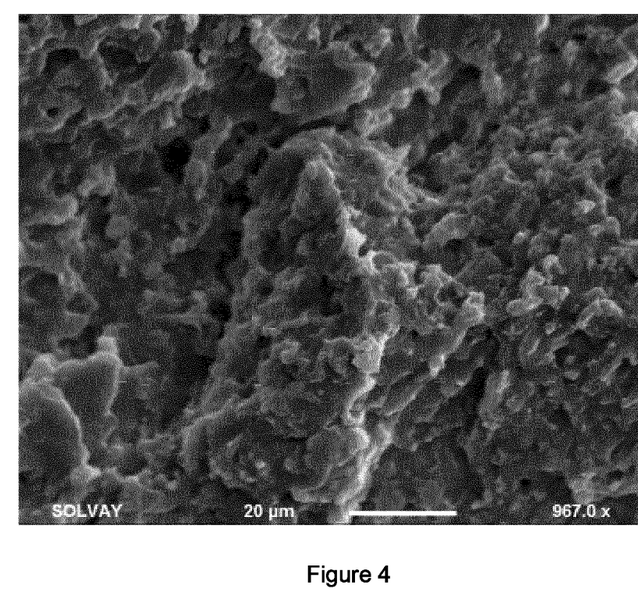
FIG. 4 shows the SEM image of the blend of Example 6 at a magnification of 967.0×

The SEM image of the blend obtained in Example 6 is shown in FIG. 4.

| Example | PPS parts | TPV parts | VDF-co-CTFE parts | Average Particle size (μm) | Elongation at break at 23° C. % | Storage modulus at 200° C. MPa |
|---|---|---|---|---|---|---|
| 1 | 0 | 100 | — | — | 250 | 0.2 |
| 2 | 75 | 25 | — | <0.2 | 16 | 95 |
| 3 | 75 | 25 | 3 | <0.2 | 20 | — |
| 4 | 50 | 50 | — | — | 50 | 45 |
| 5 | 25 | 75 | — | n.d. | 90 | 11 |
| 6 | 25 | 75 | 3 | n.d | 120 | — | n.d. = non detectable

The polymer alloys of examples 2-6, prepared according to the present invention, show a very low average particle size of the TPV and of the VDF-co-CTFE in the aromatic polymer (A). This result demonstrates the high dispersibility of TPV, and of VDF-co-CTFE copolymer, and the effect of copolymer in further improving the compatibilization of TPV with sulphur-containing aromatic polymers.

The polymer alloys of examples 2, 4 and 5 show a high shear storage modulus at 200° C., which demonstrate that the alloys according to the present invention have a mechanical strength at a temperature that is above the melting point of VDF homopolymer (polymer F).

Conversely, pure TPV comprising VDF homopolymer has the typical modulus of highly viscous materials in the range of $10^5$ Pa; this is due to the fact that the VDF homopolymer at 200° C. is fully melted.

Example 7 Adhesion Test

This example is to measure the adhesion between PPS and the polymer alloy prepared according to Example 6 (BLEND, hereinafter). A 80×130×1 mm3 plaque of the BLEND and a 80×130×3 mm plaque of PPS were separately prepared by compression molding at 310° C.

Then, the two slabs were made adhered in a 80×130×4 mm3 mold by applying a slight pressure for 5 minutes at 310° C., putting a thin PTFE tape on one side to have a non-adhered portion of the two slabs and facilitate the separation of the two slabs for adhesion measurement. After cooling at room temperature, three 12.5 mm wide strips were milled from the adhered slabs. The rigid PPS half was blocked in a 90°-peel jig while the free side of the more flexible BLEND plaque was attached to the grip of the Universal Testing Machine and drawn at 1 mm/min. All the three strips broke by cohesive failure of the BLEND at a force about 120±10 N. Therefore the adhesion force between PPS and the BLEND is higher than 9.5 N/mm.

The invention claimed is:

1. A polymer alloy (PA) which comprises:
   (a) from 10 to 40% by weight of an aromatic polymer (A), which is a sulphur-containing aromatic polymer; and
   (b) from 60 to 90% by weight of a vulcanizate (C), which is a thermoplastic vulcanizate fluorine-containing composition comprising a continuous thermoplastic fluoropolymer phase and a dispersed vulcanized fluoroelastomer phase, said composition comprising:
      i) at least one polymer (F), wherein polymer (F) is at least one thermoplastic fluoropolymer; and
      ii) at least one elastomer (E), wherein elastomer (E) is at least one (per)fluoroelastomer,
all the aforementioned percentages by weight being referred to the total weight of polymer allow (PA).

2. The polymer alloy (PA) according to claim 1 wherein the aromatic polymer (A) is a poly(arylene sulfide) (PAS) or an aromatic sulfone polymer (SP).

3. The polymer alloy (PA) according to claim 1 wherein polymer (F) comprises recurring units derived from at least one fluorinated monomer (MF) selected from the group consisting of:
   (a) $C_2$-$C_8$ perfluoroolefins;
   (b) $C_2$-$C_8$ hydrogenated fluoroolefins;
   (c) perfluoroalkylethylenes complying with formula $CH_2$=CH—$R_{f0}$, in which $R_{f0}$ is a $C_1$-$C_6$ perfluoroalkyl;
   (d) chloro- and/or bromo- and/or iodo-$C_2$-$C_6$ fluoroolefins;
   (e) (per)fluoroalkylvinylethers complying with formula $CF_2$=$CFOR_{f1}$ in which $R_{f1}$ is a $C_1$-$C_6$ fluoro- or perfluoroalkyl;
   (f) $CF_2$=$CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups;
   (g) (per)fluoroalkylvinylethers complying with formula $CF_2$=$CFOCF_2OR_{f2}$ in which $R_{f2}$ is a $C_1$-$C_6$ fluoro- or perfluoroalkyl, or a $C_1$-$C_6$ (per)fluorooxyalkyl having one or more ether groups;
   (h) functional (per)fluoro-oxyalkylvinylethers complying with formula $CF_2$=$CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;
   (i) fluorodioxoles, of formula (I):

wherein each of $R_{f3}$, $R_{f4}$, $R_{f5}$, $R_{f6}$, equal to or different from each other, is independently a fluorine atom, a $C_1$-$C_6$ fluoro- or per(halo)fluoroalkyl, optionally comprising one or more oxygen atom.

4. The polymer alloy (PA) according to according to claim 1 wherein polymer (F) comprises:
   at least 60% by moles of recurring units derived from vinylidene fluoride (VDF), optionally, from 0.1% to 15% by moles of recurring units derived from at least one fluorinated monomer different from VDF, said fluorinated monomer being selected from the group consisting of vinyl fluoride (VF1), chlorotrifluoroethylene (CTFE), hexafluoropropylene (HFP), tetrafluoroethylene (TFE), trifluoroethylene (TrFE) and perfluoromethylvinylether (PMVE), all the aforementioned % by moles being referred to the total moles of recurring units of the polymer (F).

5. The polymer alloy (PA) according to claim 3 wherein elastomer (E) comprises:
(1) VDF-based copolymers, in which VDF is copolymerized with at least one comonomer selected from the group consisting of the followings classes, with the provision that such comonomer is different from VDF:
(a1) $C_2$-$C_8$ perfluoroolefins;
(b1) hydrogen-containing $C_2$-$C_8$ olefins;
(c1) $C_2$-$C_8$ chloro and/or bromo and/or iodo-fluoroolefins;
(d1) (per)fluoroalkylvinylethers of formula $CF_2$=$CFOR_f$, wherein $R_f$ is a $C_1$-$C_6$ (per)fluoroalkyl group;
(e1) (per)fluoro-oxy-alkylvinylethers of formula $CF_2$=$CFOX$, wherein X is a $C_1$-$C_{12}$ ((per)fluoro)-oxyalkyl comprising catenary oxygen atoms;
(f1) (per)fluorodioxoles having formula:

wherein $R_{f3}$, $R_{f4}$, $R_{f5}$, $R_{f6}$, equal or different from each other, are independently selected from fluorine atoms and $C_1$-$C_6$ (per)fluoroalkyl groups, optionally comprising one or more than one oxygen atom;
(g1) (per)fluoro-methoxy-vinylethers having formula:

$CFX^2$=$CX^2OCF_2OR''_f$ wherein $R''_f$ is selected from among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X^2$ is F or H;
(h1) $C_2$-$C_8$ non-fluorinated olefins (Ol); and
(2) TFE-based copolymers, in which TFE is copolymerized with at least one comonomer selected from the group consisting of the classes (a1), (c1), (d1), (e1), (g1), (h1), and class (i2) below, with the provision that such comonomer is different from TFE;
(i2) perfluorovinyl ethers containing cyanide groups.

6. The polymer alloy (PA) according to claim 1 which comprises:
(a) from 60 to 90% by weight of aromatic polymer (A); and
(b) from 10 to 40% by weight of vulcanizate (C),
all the aforementioned % by weight being referred to the total weight of polymer alloy (PA).

7. A polymer alloy (PA) which comprises:
(a) an aromatic polymer (A), which is a sulphur-containing aromatic polymer; and
(b) a vulcanizate (C), which is a thermoplastic vulcanizate fluorine-containing composition comprising:
i) at least one polymer (F), wherein polymer (F) is at least one thermoplastic fluoropolymer; and
ii) at least one elastomer (E), wherein elastomer (E) is at least one (per)fluoroelastomer, and
(c) a copolymer (CO) comprising recurring units derived from vinylidene fluoride (VDF) and recurring units derived from chlorotrifluoroethylene (CTFE).

8. The polymer alloy (PA) according to claim 7 wherein the copolymer (CO) comprises recurring units derived:
from VDF in an amount from 50 to 90% by moles with respect to the total moles of recurring units of copolymer (CO); and
from CTFE in an amount 0.5 to 20% by moles of CTFE with respect to the total moles of recurring units of copolymer (CO).

9. The polymer alloy (PA) according to claim 7 which comprises:
(a) from 60 to 90% by weight of aromatic polymer (A);
(b) from 9 to 39% by weight of a vulcanizate (C); and
(c) from 0.1 to 20% by weight of a copolymer (CO),
all the aforementioned % by weight being referred to the total weight of polymer alloy (PA).

10. The polymer alloy (PA) according to claim 7 which comprises:
(a) from 10 to 40% by weight of aromatic polymer (A);
(b) from 59 to 89% by weight of a vulcanizate (C); and
(c) from 0.1 to 20% by weight of copolymer (CO),
all the aforementioned % by weight being referred to the total weight of polymer alloy (PA).

11. The polymer alloy (PA) according to claim 1 having a shear storage modulus at 200° C. higher than 1 MPa.

12. A process for preparing the polymer alloy (PA) according to claim 1, said process comprising melt mixing the aromatic polymer (A), the vulcanizate (C).

13. An article comprising the polymer alloy according to claim 1.

14. The polymer alloy (PA) according to claim 2 wherein the aromatic polymer (A) is a polyphenylene sulfide (PPS), a polysulfone (PSU) or a polyphenylsulfone (PPSU).

15. The polymer alloy (PA) according to according to claim 4 wherein polymer (F) comprises:
at least 85% by moles of recurring units derived from vinylidene fluoride (VDF),
from 0.1% to 10% by moles of recurring units derived from at least one fluorinated monomer different from VDF, said fluorinated monomer being selected from the group consisting of vinyl fluoride (VF1), chlorotrifluoroethylene (CTFE), hexafluoropropylene (HFP), tetrafluoroethylene (TFE), trifluoroethylene (TrFE) and perfluoromethylvinylether (PMVE), all the aforementioned % by moles being referred to the total moles of recurring units of the polymer (F).

16. The polymer alloy (PA) according to claim 6 which comprises:
(a) from 70 to 80% by weight of aromatic polymer (A); and
(b) from 20 to 30% by weight of vulcanizate (C),
all the aforementioned % by weight being referred to the total weight of polymer alloy (PA).

17. The polymer alloy (PA) according to claim 1 which comprises:
(a) from 15 to 25% by weight of aromatic polymer (A); and
(b) from 75 to 85% by weight of vulcanizate (C),
all the aforementioned percentages by weight being referred to the total weight of polymer alloy (PA).

18. The polymer alloy (PA) according to claim 9 which comprises:
(a) from 70 to 80% by weight of aromatic polymer (A);

(b) from 20 to 30% by weight of a vulcanizate (C); and
(c) from 2 to 5% by weight, of a copolymer (CO),
all the aforementioned % by weight being referred to the total weight of polymer alloy (PA).

19. The polymer alloy (PA) according to claim 10 which comprises:
(a) from 15 to 25% by weight of aromatic polymer (A);
(b) from 75 to 85% by weight of a vulcanizate (C); and
(c) from 2 to 5% by weight of copolymer (CO),
all the aforementioned % by weight being referred to the total weight of polymer alloy (PA).

* * * * *